US010529198B1

(12) United States Patent
Khoshkava (10) Patent No.: US 10,529,198 B1
(45) Date of Patent: Jan. 7, 2020

(54) TUNABLE RESONANCE HAPTIC DEVICE

(71) Applicant: Immersion Corporation, San Jose, CA (US)

(72) Inventor: Vahid Khoshkava, Laval (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 16/233,447

(22) Filed: Dec. 27, 2018

(51) Int. Cl.
*G08B 6/00* (2006.01)
*B06B 1/04* (2006.01)
*H02K 33/00* (2006.01)

(52) U.S. Cl.
CPC .............. *G08B 6/00* (2013.01); *B06B 1/045* (2013.01); *H02K 33/00* (2013.01)

(58) Field of Classification Search
CPC ........... G08B 6/00; B06B 1/045; H02K 33/00
See application file for complete search history.

(56) References Cited

U.S. PATENT DOCUMENTS

| | | | | |
|---|---|---|---|---|
| 4,610,420 A * | 9/1986 | Fukushima | ........... | F16F 13/262 180/300 |
| 6,424,333 B1 * | 7/2002 | Tremblay | ................ | G06F 3/011 345/156 |
| 6,693,622 B1 * | 2/2004 | Shahoian | ................ | G06F 3/016 345/156 |
| 8,857,585 B2 * | 10/2014 | Ryaboy | .................... | F16F 7/116 188/380 |
| 9,527,110 B2 * | 12/2016 | Akasaka | .................... | B06B 1/04 |
| 2006/0157632 A1 * | 7/2006 | Delson | .................. | H01F 7/1615 248/550 |
| 2006/0290662 A1 * | 12/2006 | Houston | ................. | A63F 13/06 345/156 |
| 2010/0154151 A1 * | 6/2010 | Grez | ...................... | A61C 17/32 15/22.1 |
| 2011/0115501 A1 * | 5/2011 | He | ...................... | G01C 19/5726 324/661 |
| 2012/0048022 A1 * | 3/2012 | Dienel | .................. | G01H 13/00 73/658 |
| 2012/0168271 A1 * | 7/2012 | Ryaboy | .................... | F16F 7/116 188/379 |
| 2012/0248243 A1 * | 10/2012 | Greenyer | ................ | B64C 33/02 244/72 |
| 2015/0076931 A1 * | 3/2015 | Akasaka | ................... | B06B 1/04 310/19 |
| 2015/0349619 A1 * | 12/2015 | Degner | .............. | H02K 41/0356 310/12.21 |

* cited by examiner

*Primary Examiner* — Joseph H Feild
*Assistant Examiner* — Rufus C Point
(74) *Attorney, Agent, or Firm* — Miles & Stockbridge P.C.

(57) ABSTRACT

Rendering of a haptic effect at a target frequency or frequency range by providing a moveable mass configured to be driven at a resonance frequency of a primary spring coupled to the moveable mass. Then, an auxiliary spring is temporarily engaged with the moveable mass to tune the resonance frequency to the target frequency or frequency range.

20 Claims, 5 Drawing Sheets

TUNABLE RESONANCE HAPTIC DEVICE

FIELD OF INVENTION

Embodiments of the present invention are generally directed to tunable resonance frequency, and more particular, to the rendering of haptics at a target frequency or frequency range by tuning the resonance frequency to the target frequency or frequency range.

BACKGROUND

Haptics relate to tactile and force feedback technology that takes advantage of an individual's sense of touch by applying haptic feedback effects (i.e., "haptic effects"), such as forces, vibrations, and motions, to the individual. Devices, such as mobile devices, touchscreen devices, and personal computers, can be configured to generate haptic effects. For example, if a user interacts with the device using, for example, a button, touchscreen, lever, joystick, wheel, or some other control element, the operating system of the device can send a command through control circuitry to produce the appropriate haptic effect.

Devices can be configured to coordinate the output of haptic effects with the output of other content, such as audio, so that the haptic effects are incorporated into the other content. For example, audio effects that can be output by the device, such as machine gun fire, explosions, or car crashes. Further, other types of content, such as video effects, can be output by the device.

The device can be configured to output the haptic effect along with the other content. However, such a process generally requires a haptic effect that correctly compliments the audio effect, or other type of content. A poorly-rendered haptic effect that does not compliment the audio effect, or other type of content, can produce an overall dissonant effect where the haptic effect does not "mesh," or is not timely rendered, with the audio effect or other content, providing a poor user experience.

SUMMARY

Embodiments of the present invention are generally directed to tunable resonance frequency, and more particular, to the rendering of haptics at a target frequency or frequency range by tuning the resonance frequency to the target frequency or frequency range.

In an embodiment, a haptic output device includes a moveable mass configured to render a haptic effect, a primary spring coupled to the moveable mass, wherein the moveable mass is driven at a resonance frequency of the primary spring, and at least one auxiliary spring configured to temporarily engage with the moveable mass to tune the resonance frequency to a target frequency or frequency range at which the haptic effect is rendered.

In another embodiment, rendering of a haptic effect at a target frequency or frequency range includes providing a moveable mass configured to be driven at a resonance frequency of a primary spring coupled to the moveable mass, and rendering the haptic effect at the target frequency by temporarily engaging at least one auxiliary spring with the moveable mass to tune the resonance frequency to the target frequency or frequency range.

BRIEF DESCRIPTION OF THE DRAWINGS

Example embodiments will be more clearly understood from the following detailed description taken in conjunction with the accompanying drawings. FIGS. 1-5 represent non-limiting, embodiments as described herein.

DETAILED DESCRIPTION

Embodiments of the present invention are generally directed to tunable resonance frequency, and more particular, to the rendering of haptics at a target frequency or frequency range by tuning the resonance frequency to the target frequency or frequency range.

In accordance with the embodiments, a haptically-enabled device is a device having embedded hardware (e.g., actuators, haptic output devices, or other output mechanisms) configured to apply the haptic effects. The embedded hardware is, generally, programmed to apply (or playback) a particular set of haptic effects. If a signal specifying which haptic effect(s) to play is received by the haptically-enabled device, the haptically-enabled device renders the specified haptic effect.

Generally, actuators, in particular, electromagnetic-driven actuators, and other non-HD haptic output device, are driven at a narrow resonance frequency, limiting the designing of haptic effects.

In accordance with embodiments, an actuator is provided that includes a moveable mass that is driven at a resonance frequency, such as about 150 Hz or from 50-500 Hz or from 150-200 Hz, of a primary spring coupled to the moveable mass to render a haptic effect. However, the resonance frequency is tunable to a target frequency or frequency range, such as 1 GHz or from 1-1.2 GHz, other than the resonance frequency by temporarily engaging auxiliary spring(s) with the moveable mass. Thus, embodiments allow for the designing of haptic effects that can be rendered at more than one frequency or in more than one frequency range.

In accordance with embodiments, multimodal augmentation, based on multiple stimuli (e.g., audio and haptics, or haptics having different frequencies) of more than one modality, can be used to produce interaction effects that augment an individual's perceptual experience of the stimuli.

As used herein a "non-high definition (HD)" actuator or a non-HD haptic output device is a device that has a narrow frequency bandwidth (e.g., +/−2.5 Hz or less), a transition time of about 30 ms, moderate audible noise, a peak-to-peak acceleration of less than 3 Gpp, or about 2 Gpp or less, or about 1 Gpp or less, as measured using a 100 g mass, and/or has a non-linear behavior over the operating frequency range. Examples of a non-HD actuator include inertial actuators such as an electromagnetic actuator (e.g., a linear resonance actuator ("LRA")), a solenoid resonance actuator ("SRA"), an electrostatic friction display, an ultrasonic vibration generator, a voice coil or an electric motor.

As used herein a "HD actuator" or an HD haptic output device is a device that has a wide frequency bandwidth (e.g., +/−greater than 2.5 Hz, or +/−10 Hz), a transition time of about 0.5 ms, no audible noise, a peak-to-peak acceleration of 3 Gpp or more as measured using a 100 g mass, and/or has a linear behavior over the operating frequency range. Examples of a HD actuator include a piezoelectric actuator, a ceramic actuator or an actuator including smart material(s) such as a shape memory alloy, or an electro-active polymer ("EAP").

As used herein "being configured to temporarily engage" means being configured to assume a first state of being coupled, and a second state of being decoupled.

Figure 1:
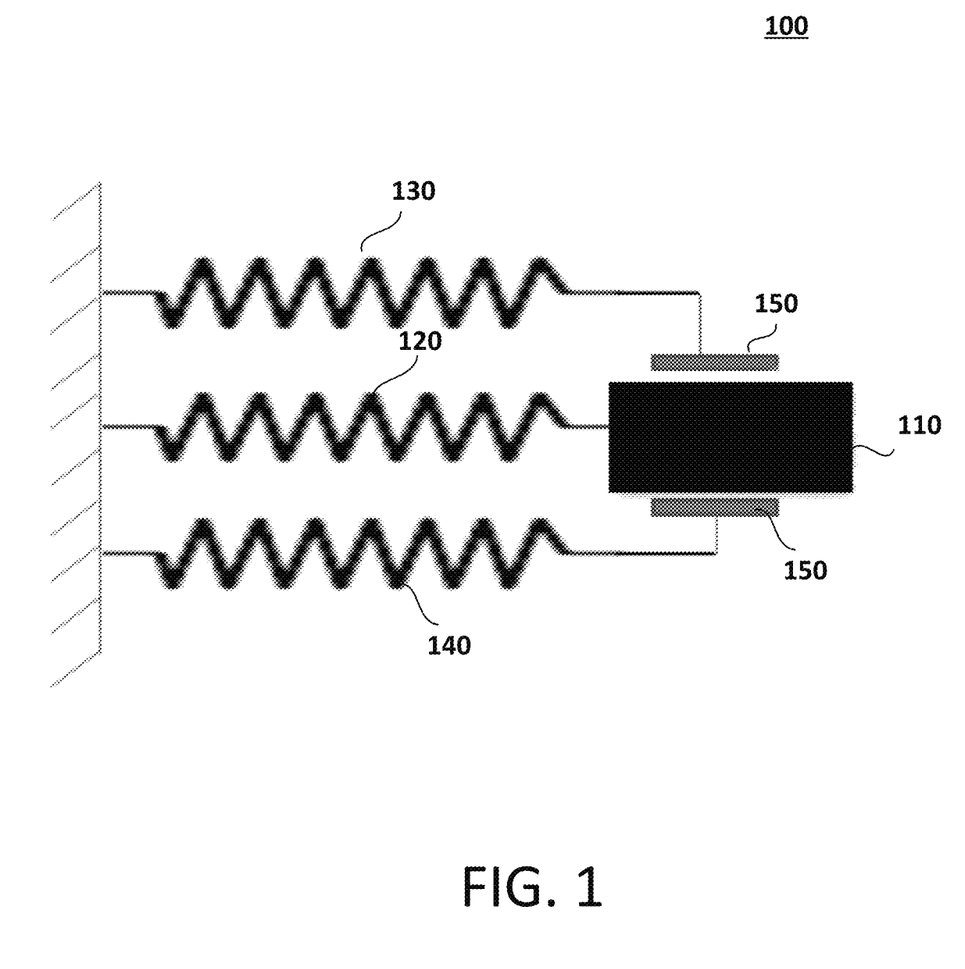
FIG. 1 is a diagram of a haptic output device according to an example embodiment.

FIG. 1 is a diagram of a haptic output device according to an example embodiment.

Haptic output device 100 is a device configured to output haptic effects, such as vibrotactile haptic effects, electrostatic friction haptic effects, temperature variation, and/or deformation haptic effects, in response to a drive signal. An actuator is an example of haptic output device 100.

Referring to FIG. 1, a haptic output device 100 includes a moveable mass 110 configured to render a haptic effect. Moveable mass 110 is coupled to a primary spring 120. Primary spring 120 can keep moveable mass 110 under tension at rest or during compression of moveable mass 110. Due to the coupling of moveable mass 110 and primary spring 120, moveable mass 110, and therefore haptic output device 100, are driven at a resonance frequency (e.g., +/−20 Hz, 30 Hz, 40 Hz, etc.) of primary spring 120. Moveable mass 110 can weigh less than one (1) gram, which allows moveable mass 110 to move quickly. However, example embodiments are not limited thereto, and moveable mass 110 can weight more than 1 g. Moveable mass 110 can be formed of a magnetic material such as ferromagnetic materials (e.g., iron, nickel, cobalt, and alnico, an aluminum-nickel-cobalt alloy).

At least one auxiliary spring 130, 140 is configured to temporarily engage with moveable mass 110 to tune the resonance frequency to a target frequency or frequency range at which the haptic effect is rendered. Specifically, if auxiliary springs 130, 140 are engaged with moveable mass 110, a stiffness of auxiliary springs 130, 140 affects the resonance frequency of moveable mass 110, and therefore, haptic output device 100. Thus, for instance, if (i) auxiliary springs 130, 140 are not engaged with moveable mass 110 and (ii) primary spring 120 is resonating at a frequency of about 250 Hz or from 250-300 Hz, moveable mass 110 and haptic output device 100 will also resonate at the frequency of about 250 Hz or from 250-300 Hz. Alternatively, if (i) auxiliary springs 130, 140 are engaged with moveable mass 110 and (ii) primary spring 120 is resonating at a frequency of about 250 Hz or from 250-300 Hz, moveable mass 110 and haptic output device 100 could resonate, for example, at a frequency of 2 GHz or from 2-5 GHz depending on the stiffness of auxiliary springs 130, 140. In other words, moveable mass 110 and haptic output device 100 could at a frequency greater than the resonance frequency of primary spring 120, depending on the stiffness of auxiliary springs 130, 140. Thus, embodiments allow for the designing of haptic effects that can be rendered at two frequencies or frequency ranges based on coupling or decoupling of auxiliary springs 130,140.

As shown in Equation (1) below, the resonance frequency of haptic output device, f, is a function of the square root of mass, m (measured in kg), divided by stiffness or spring constant, k (measured in Newtons/meter).

$$f = \frac{1}{2\pi}\sqrt{\frac{k}{m}}$$ EQUATION (1)

According to embodiments, a stiffness of auxiliary springs 130, 140 is adjustable in order to further tune the resonance frequency to a target frequency or frequency range. For instance, if (i) auxiliary springs 130, 140 are engaged with moveable mass 110 and the stiffness of auxiliary springs 130, 140 is increased, and (ii) primary spring 120 is resonating at a frequency of about 250 Hz or from 250-300 Hz, moveable mass 110 and haptic output device 100 could resonate, for example, at the frequency of 2 GHz or from 2-5 GHz and at a frequency greater than 5 GHz depending on the stiffness of auxiliary springs 130, 140. In other words, moveable mass 110 and haptic output device 100 could resonate at a second frequency based on a first stiffness of auxiliary springs 130, 140 and a third frequency based on a second stiffness of auxiliary springs 130, 140, both of the second and third frequencies being greater than the resonance frequency of primary spring 120. Thus, embodiments allow for the designing of haptic effects that can be rendered at three or more frequencies or frequency ranges based on coupling or decoupling, and/or the stiffness, of auxiliary springs 130,140.

According to another embodiment, auxiliary spring 130 can have a stiffness different from, or the same as, a stiffness of auxiliary spring 140. In a further embodiment, (i) auxiliary spring 130 can have a stiffness different from a stiffness of auxiliary spring 140, and (ii) auxiliary spring 130 can cause moveable mass 110 to resonate at a first frequency, and auxiliary spring 140 can cause moveable mass 110 to resonate at a second frequency. The first and second target frequencies can be the same as, or different from, each other. Auxiliary springs 130, 140 can be temporarily engaged with moveable mass 110 at the same time, or at overlapping times, or at different times.

It can be appreciated by those skilled in the art that the resonance frequency of haptic output device 100 can also depend on the way mass and stiffness are distributed within haptic output device 100. For instance, according to an embodiment, auxiliary springs 130, 140 can be configured to temporarily engage with opposing sides of moveable mass 110, as shown in FIG. 1. However, embodiments are not limited thereto.

According to an embodiment, auxiliary spring 130 can be configured to temporarily engage with moveable mass 110 at a first time, $t_1$, and auxiliary spring 140 can be configured to temporarily engage with moveable mass 110 at a second time, $t_2$. The second time, $t_2$, can partially overlap with the first time, $t_1$, to allow for the designing of a haptic effect whereby the feel of the haptic effect changes, and/or further causes the haptic effect to be considered "dynamic" such as haptic effects rendered to convey changes in tension. In other embodiments, the second time, $t_2$, can completely overlap with the first time, $t_1$.

Referring again to FIG. 1, auxiliary springs 130, 140 can each be coupled to an electroadhesive pad 150. Electroadhesive pad 150 consists of conductive electrodes placed upon a polymer substrate. Auxiliary springs 130, 140 can be configured to temporarily engaged with moveable mass 110 via electroadhesion using electroadhesive pad 150. Electroadhesion, as used in the context of this disclosure, is an electrically controllable and dynamic electrostatic attraction between electroadhesive pad 150 and moveable mass 110. Moveable mass 110 can be subjected to an electromagnetic field by applying a current across leads of haptic output device 100. If alternate positive and negative charges are induced on leads of haptic output device 100, the resulting electromagnetic field sets up opposite charges on the surface of moveable mass 110 that electroadhesive pad 150 touches, and thus causes electrostatic adhesion between the conductive electrodes of electroadhesive pad 150 and the induced charges in the touched surface material of moveable mass 110.

In alternative embodiments, auxiliary springs 130, 140 can be configured to temporarily engage with moveable mass 110 by other locking mechanisms well known in the art such as by mechanical or magnetic locking.

In accordance with embodiments, multimodal augmentation, as used in the context of this disclosure, is the combined stimulation of more than one modality producing complementary and/or additive effects not achievable through single stimulus. Multiple stimuli (e.g., audio and haptics or haptics having different frequencies) can be combined to produce interaction effects that augment an individual's perceptual experience of the stimuli. For instance, in an example embodiment, audio may be used to increase the magnitude of a haptic sensation. In an embodiment, a modality (such as an audio signal) can be tuned to produce a complementary and/or additive effect to the target frequency or frequency range at which the haptic effect is rendered. In another example embodiment, an interface, or a boundary, of a haptic effect (e.g., a mechanical click occurring at about 200-300 Hz for 5-10 ms) can be rendered at a high frequency, and another haptic effect for the background of the haptic effect can be rendered at a low frequency (e.g., an explosion occurring at about 50-100 Hz). The low-frequency haptic effect and/or the high-frequency haptic effect can be tuned to produce haptic effects that are complementary and/or additive to one another.

Figure 2:
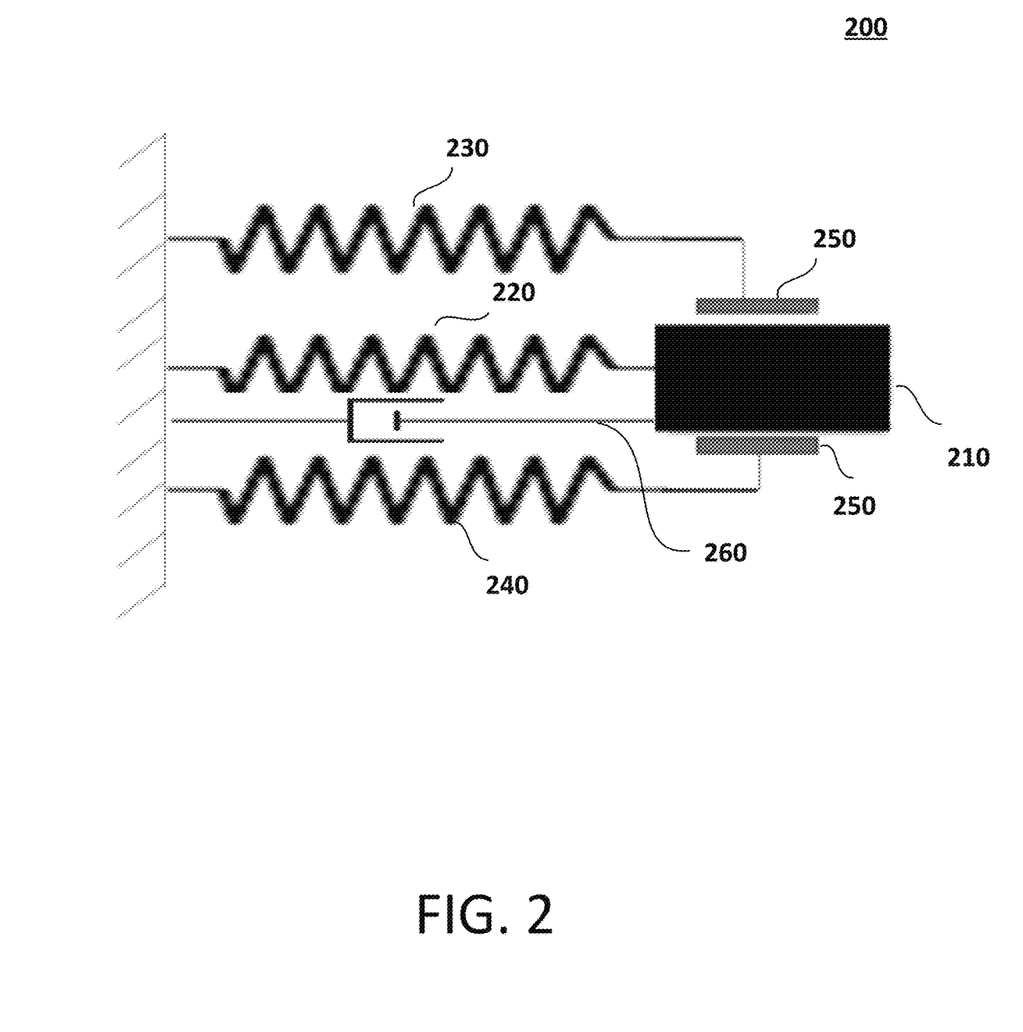
FIG. 2 is a diagram of a haptic output device according to another example embodiment.

FIG. 2 is a diagram of a haptic output device according to another example embodiment.

Like elements in haptic output device 200 of FIG. 2 and haptic output device 100 of FIG. 1 include similar reference numbers, and therefore the description of these elements will be not repeated for the sake of brevity.

Referring to FIG. 2, haptic output device 200 includes a damper 260. Damper 260 is configured to temporarily engage with moveable mass 210 to further tune the resonance frequency to the target frequency or frequency range. Damper 260 widens the frequency range, as well as function as a braking mechanism. For instance, if (i) auxiliary springs 230, 240 are engaged with moveable mass 210 and the stiffness of auxiliary springs 230, 240 is increased, and (ii) primary spring 220 is configured to resonate at a frequency of about 250 Hz or from 250-300 Hz, moveable mass 210 and haptic output device 200 could resonate, for example, at the frequency of 2 GHz or from 2-5 GHz and at a frequency greater than 5 GHz depending on the stiffness of auxiliary springs 130, 140. Thus, as described above in conjunction with FIG. 1, moveable mass 210 and haptic output device 200 could resonate at a second frequency and a third frequency both greater than the resonance frequency of primary spring 120, depending on the stiffness of auxiliary springs 130, 140. If damper 260 is temporarily engaged with moveable mass 210, moveable mass 210 and haptic output device 200 could resonate, for example, at a frequency greater than 300 Hz and less than 2 GHz. Thus, damper 260 increases the frequency range from 250-300 Hz to 300 Hz –2 GHz. Thus, embodiments allow for the designing of haptic effects that can be rendered at four or more frequencies or frequency ranges, based on coupling or decoupling, and/or the stiffness, of auxiliary springs 130,140 and coupling or decoupling of damper 260.

According to an example embodiment, moveable mass 110 or 210 is an electromagnetic-driven moveable mass, and haptic output device 100 or 200 is a non-high definition ("HD") actuator, for example, a linear resonance actuator ("LRA").

In an alternative embodiment, a suspension can be driven by an actuator. The suspension can be comprised of a soft material. The stiffness of the suspension can reversibly be changed using a thermal, electrical or chemical source to tune the resonance frequency of the haptic output device.

In accordance with example embodiments, dampers only, auxiliary springs only, suspensions only, or combinations thereof could be used to tune the resonance frequency of the haptic output device.

Figure 3:
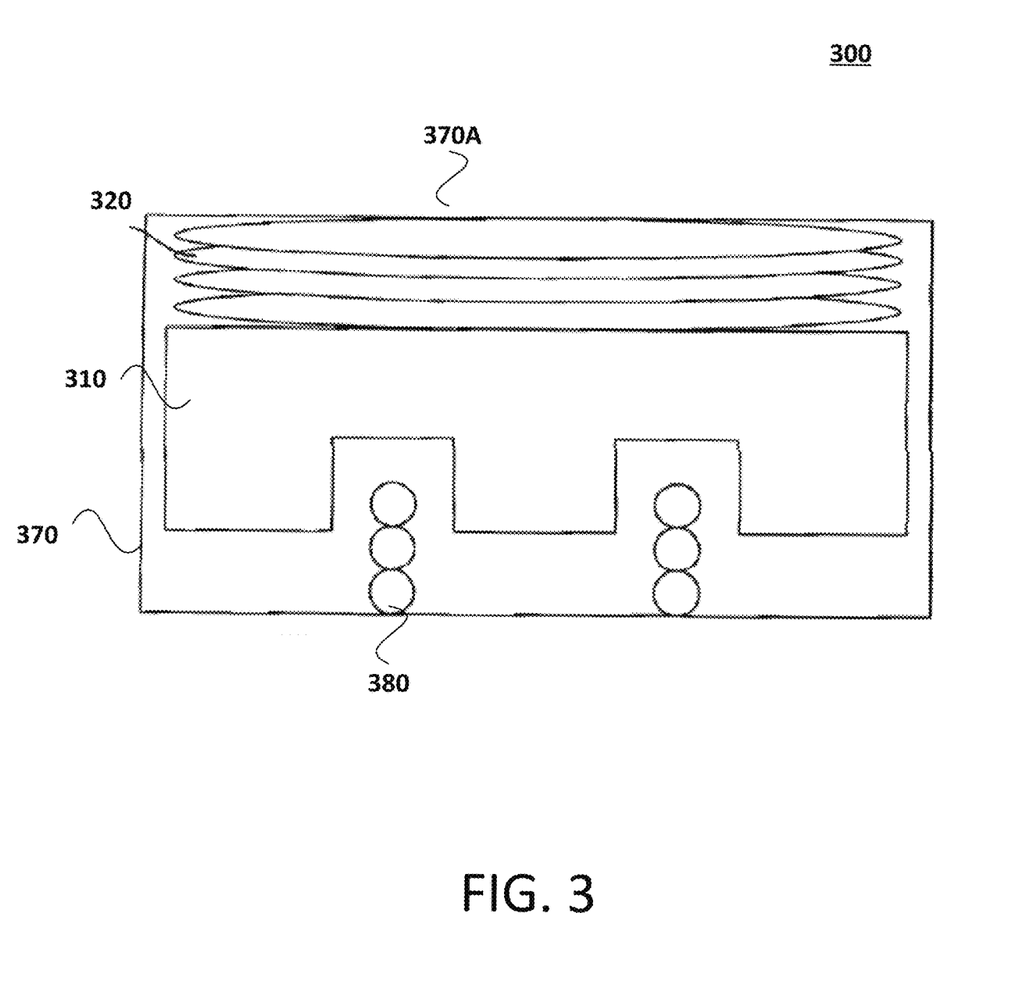
FIG. 3 is a schematic cross sectional diagram of a haptic output device in accordance to an embodiment.

FIG. 3 is a schematic cross sectional diagram of a haptic output device in accordance to an embodiment.

Like elements in haptic output device 300 of FIG. 3 and haptic output device 100 of FIG. 1 include similar reference numbers, and therefore the description of these elements will be not repeated for the sake of brevity.

Referring to FIG. 3, haptic output device 300 includes a casing 370, a moveable mass 310, a primary spring 320, auxiliary springs (not shown) and an electric coil 380. Moveable mass 310 can be formed of a magnetic material. Moveable mass 310 is mounted to surface 370A of haptic output device 300 by primary spring 320. Surface 370A can be a touch screen or casing 370 of haptic output device 300. Electric coil 380 is mounted directly on the surface of casing 370 underneath the moveable mass 310. Haptic output device 300 can be an implementation of, for example, a known LRA. In operation, if an AC current flows through coil 380, a magnetic field forms around coil 380 and, in interaction with the magnetic field of coil 380, pushes or pulls on the moveable mass 310. One current flow direction/polarity causes a push action and the other a pull action. Primary spring 320 controls the up and down movement of moveable mass 310 and has a deflected up position where it is compressed, a deflected down position where it is expanded, and a neutral or zero-crossing position where it is neither compressed or deflected. The neutral or zero-crossing position is equal to its resting state if no current is being applied to coil 380 and there is no movement/oscillation of the moveable mass 310.

The auxiliary springs described in accordance with the embodiments provided herein (see elements 130, 140 in FIG. 1) provide for the rendering of haptic effects at additional frequencies or frequency ranges (other than the resonance frequency) without requiring an additional voltage source other than the source providing the AC current that flows through coil 380.

While example embodiments have been described using a LRA implementation, embodiments are not limited thereto. One skilled in the art would appreciate that auxiliary springs 130, 140 can be implemented any non-HD haptic output device (such as a solenoid resonance actuator ("SRA"), an electrostatic friction display, an ultrasonic vibration generator, a voice coil or an electric motor) or an HD haptic output device (such as a piezoelectric actuator, a ceramic actuator or an actuator including smart material(s) such as a shape memory alloy, or an electro-active polymer ("EAP")). For instance, a beam can be exciting a smart material, and springs can be engaged and/or dimensions of the beam can be changed to tune the resonance frequency of the beam.

Furthermore, embodiments can be implemented in haptic output devices other than an actuator. For instance, a haptic output device can contain a suspension comprised of a soft material. The suspension can be driven by an actuator, and the stiffness of the suspension can reversibly be changed using a thermal, electrical or chemical source to tune the resonance frequency of the haptic output device.

Figure 4:
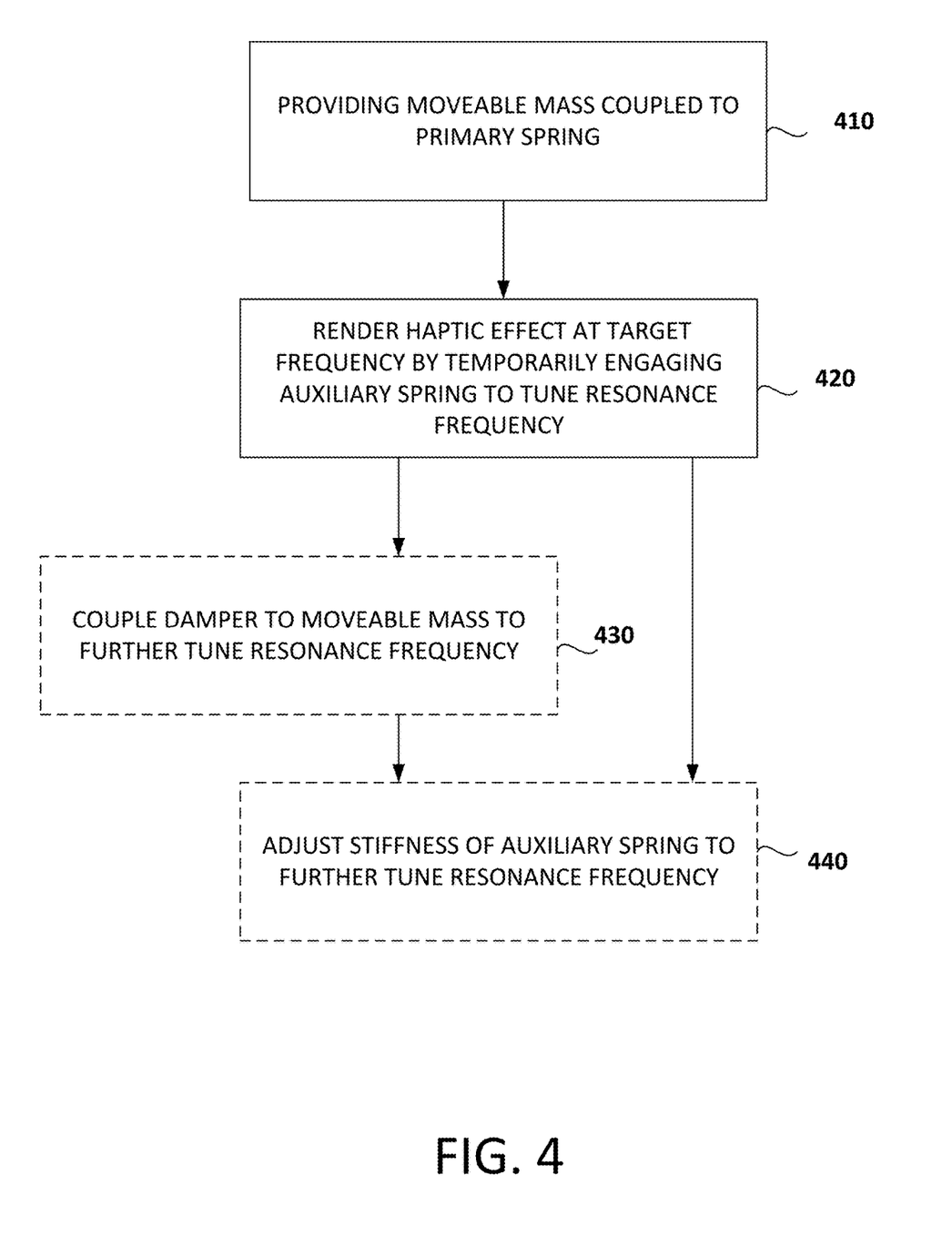
FIG. 4 is a flow diagram of rendering haptics according to example embodiment.

FIG. 4 is a flow diagram of rendering haptics according to example embodiment.

Referring to FIG. 4, rendering of a haptic effect at a target frequency or frequency range according to example embodiments includes providing a moveable mass configured to be driven at a resonance frequency of a primary spring coupled to the moveable mass, at 410.

At 420, at least one auxiliary spring is temporarily engaged with the moveable mass to tune the resonance frequency to the target frequency or frequency range, thereby rendering the haptic effect at the target frequency. For instance, if (i) the at least one auxiliary spring is not engaged with the moveable mass and (ii) the primary spring is resonating at a first frequency or frequency range, the moveable mass and a haptic output device containing the moveable mass will also resonate at the first frequency or frequency range. Alternatively, if (i) the at least one auxiliary spring is engaged with the moveable mass and (ii) the primary spring is resonating at the first frequency or frequency range, the moveable mass and the haptic output device could resonate, for example, at a second frequency or frequency range greater than the first frequency or frequency range.

At 440, a stiffness of the at least one auxiliary spring engaged with the moveable mass can be adjusted to further tune the resonance frequency to the target frequency or frequency range. The adjusting of the stiffness of at least one auxiliary spring can cause a frequency range of the resonance frequency to increase or decrease. For instance, if (i) the at least one auxiliary spring is engaged with the moveable mass and the stiffness of the at least one auxiliary spring is increased, and (ii) the primary spring is resonating at a first frequency or frequency range, the moveable mass could resonate, for example, at the second frequency or frequency range (which is greater than the first frequency or frequency range) and at a third frequency or frequency range (which is greater than the first and second frequencies or frequency ranges) depending on the stiffness of the at least one auxiliary springs.

In accordance with an embodiment, the at least one auxiliary spring can include a first auxiliary spring and a second auxiliary spring coupled to opposing sides of the moveable mass, and the rendering of the haptic effect at the target frequency or frequency range includes temporarily engaging the first auxiliary spring and/or the second auxiliary spring with the moveable mass. The temporarily engaging of the first auxiliary spring with the moveable mass causes the moveable mass to resonate at a first target frequency. The temporarily engaging of the second auxiliary spring with the moveable mass causes the moveable mass to resonate at a second target frequency. The first and second target frequencies can be the same as, or different from, each other. The first and second auxiliary springs can be temporarily engaged with the moveable mass at the same time, at overlapping times or at different times.

According to an embodiment, the at least one auxiliary spring can be coupled to an electroadhesive pad, and the temporarily engaging of the at least one auxiliary spring with the moveable mass can include coupling the electroadhesive pad to the moveable mass via electroadhesion.

In an embodiment, the moveable mass, the primary spring and the at least one auxiliary spring are within a single actuator casing, and the rendering of the haptic effect at the target frequency or frequency range includes driving the moveable mass using an electromagnetic field generated by applying a current across leads of the actuator. The actuator can be a LRA or a non-HD actuator.

At 430, a damper can be coupled to the moveable mass to further tune the resonance frequency to the target frequency or frequency range.

Figure 5:
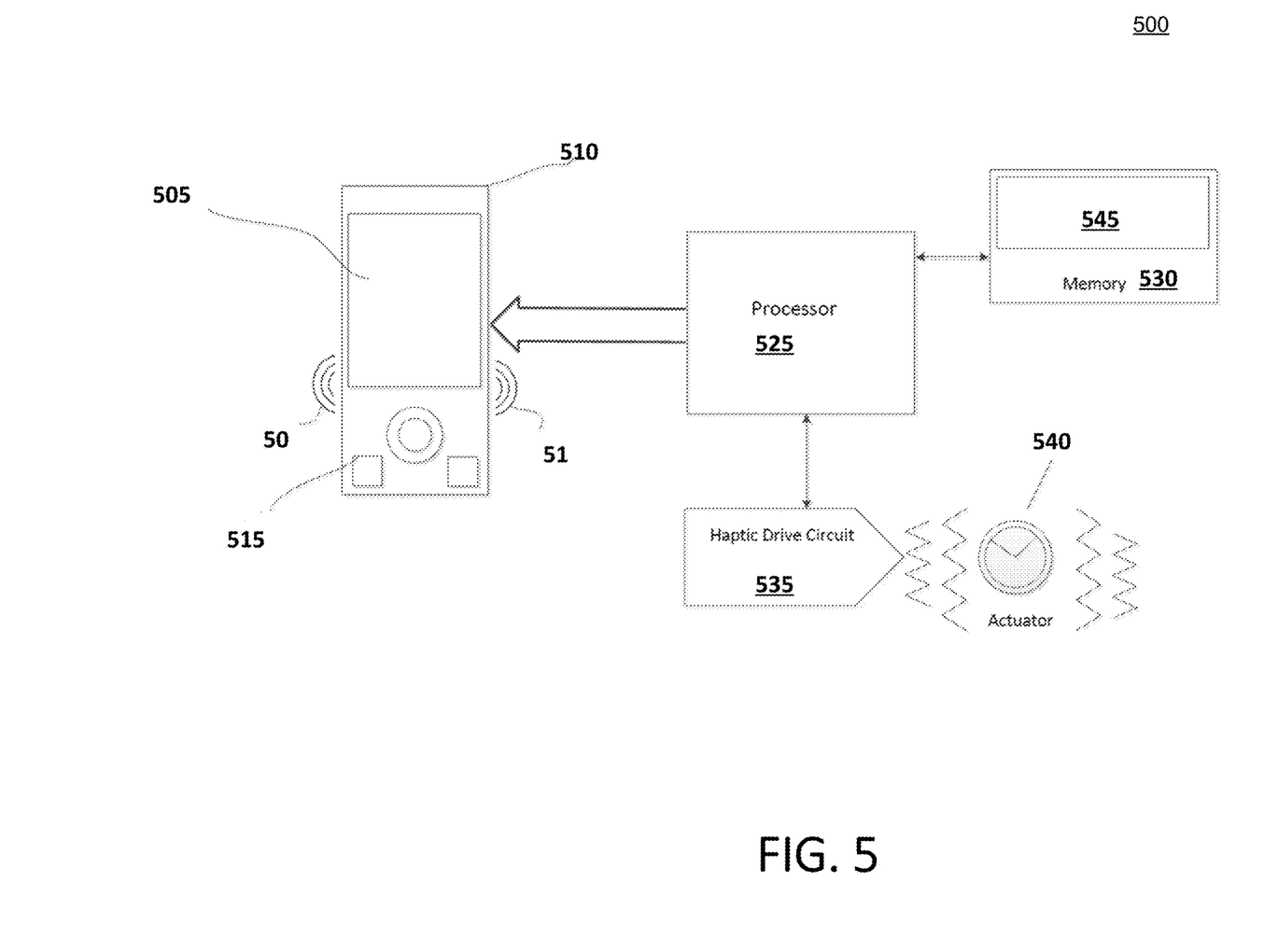
FIG. 5 is a block diagram of a haptically-enabled system/device according to an embodiment.

FIG. 5 is a block diagram of a haptically-enabled system/device according to an embodiment.

Referring to FIG. 5, haptically-enabled system/device 500 includes a touch sensitive surface 505 or other type of user interface mounted within a housing 510, and may include mechanical keys/buttons 515.

Internal to system 500 is a haptic feedback system that generates haptic effects on system 500 and includes a processor or controller 525. Coupled to processor 525 is a memory 530, and a haptic drive circuit 535 which is coupled to a non-HD actuator 540. Non-HD actuator 540 can be mounted on touch sensitive surface 505 or housing 510. Processor 525 may be any type of general purpose processor, or could be a processor specifically designed to provide haptic effects, such as an application-specific integrated circuit ("ASIC"). Processor 525 may be the same processor that operates the entire system 500, or may be a separate processor. Processor 525 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction. The haptic feedback system in one embodiment generates vibrations 50, 51 or other types of haptic effects on system 500.

Processor 525 outputs the control signals to haptic drive circuit 535, which includes electronic components and circuitry used to supply non-HD actuator 540 with the required electrical current and voltage (i.e., "motor signals") to cause the desired haptic effects. System 500 may include more than non-HD actuator 540 as well as other actuator types (e.g., HD actuators), and each actuator may include a separate haptic drive circuit 535, all coupled to a common processor 525.

Haptic drive circuit 535 is configured to generate one or more haptic drive signals. For example, the haptic drive signal may be generated at and around the resonance frequency (e.g., +1-20 Hz, 30 Hz, 40 Hz, etc.) of non-HD actuator 540. In certain embodiments, haptic drive circuit 535 may comprise a variety of signal processing stages, each stage defining a subset of the signal processing stages applied to generate the haptic command signal.

Non-transitory memory 530 may include a variety of computer-readable media that may be accessed by processor 525. In the various embodiments, memory 530 and other memory devices described herein may include a volatile and nonvolatile medium, removable and non-removable medium. For example, memory 530 may include any combination of random access memory ("RAM"), dynamic RAM ("DRAM"), static RAM ("SRAM"), read only memory ("ROM"), flash memory, cache memory, and/or any other type of non-transitory computer-readable medium. Memory 530 stores instructions executed by processor 525.

Among the instructions, memory 530 includes module 545, which are instructions that, when executed by processor 525, cause processor 525 to perform operations of driving a moveable mass at a resonance frequency of a primary spring coupled to the moveable mass; and rendering a haptic effect at a target frequency or frequency range by temporarily engaging at least one auxiliary spring with the moveable mass to tune the resonance frequency to the target frequency or frequency range.

Module 545, when executed by processor 525, cause processor 525 to further perform the operation of adjusting a stiffness of the at least one auxiliary spring engaged with the moveable mass to further tune the resonance frequency to the target frequency or frequency range. The adjusting of the stiffness of at least one auxiliary spring can cause a frequency range of the resonance frequency to increase or decrease.

Module 545, when executed by processor 525, cause processor 525 to further perform the operation of coupling a damper to the moveable mass to further tune the resonance frequency to the target frequency or frequency range.

System 500 may be any type of handheld/mobile device, such as a cellular telephone, personal digital assistant ("PDA"), smartphone, computer tablet, gaming console, controller or split controller, remote control, or any other type of device that includes a haptic effect system that includes one or more actuators. System 500 may be a wearable device such as wristbands, headbands, eyeglasses, rings, leg bands, arrays integrated into clothing, etc., or any other type of device that a user may wear on a body or can be held by a user and that is haptically enabled, including furniture or a vehicle steering wheel or dashboard. Further, some of the elements or functionality of system 500 may be remotely located or may be implemented by another device that is in communication with the remaining elements of system 500.

The embodiments of the present invention are directed to non-HD actuators or non-HD haptic output devices. Many types of non-HD actuators may be used. For example, in some embodiments, the non-HD actuator can be an electric motor, an electro-magnetic actuator, a voice coil, a solenoid, a linear resonance actuator ("LRA"), a solenoid resonance actuator ("SRA"), an electrostatic friction display, an ultrasonic vibration generator, or the like. In some instances, the actuator itself may include a haptic drive circuit.

However, example embodiments are not limited thereto, and the embodiments of the present invention can also be applied to HD actuators or HD haptic output devices. For instance, the HD actuator can be a piezoelectric actuator, a ceramic actuator or an actuator including smart material(s) such as a shape memory alloy, or an electro-active polymer ("EAP").

Embodiments of the present invention provide for the designing of haptic effects that can be rendered at more than one frequency or in more than one frequency range.

Embodiments also provide for the rendering of haptic effects at additional frequencies or frequency ranges without requiring an additional voltage source, lowering current consumption.

Several embodiments have been specifically illustrated and/or described. However, it will be appreciated that modifications and variations of the disclosed embodiments are covered by the above teachings and within the purview of the appended claims without departing from the spirit and intended scope of the invention.

What is claimed is:

1. A haptic output device, comprising:
   a moveable mass configured to render a haptic effect;
   a primary spring coupled to the moveable mass, wherein the moveable mass is driven at a resonance frequency of the primary spring; and
   at least one auxiliary spring configured to temporarily engage with the moveable mass to tune the resonance frequency to a target frequency or frequency range at which the haptic effect is rendered.

2. The haptic output device of claim 1, wherein a stiffness of the at least one auxiliary spring is adjustable in order to further tune the resonance frequency to the target frequency or frequency range.

3. The haptic output device of claim 1, wherein the at least one auxiliary spring includes a first auxiliary spring and a second auxiliary spring configured to temporarily engage with opposing sides of the moveable mass.

4. The haptic output device of claim 3, wherein
   the first auxiliary spring is configured to temporarily engage with the moveable mass at a first time, and
   the second auxiliary spring is configured to temporarily engage with the moveable mass at a second time, the second time at least partially overlapping with the first time.

5. The haptic output device of claim 1, wherein
   the at least one auxiliary spring is coupled to an electroadhesive pad, and
   the at least one auxiliary spring is temporarily engaged with the moveable mass via the electroadhesive pad.

6. The haptic output device of claim 5, wherein
   the at least one auxiliary spring is temporarily engaged with the moveable mass via a locking mechanism.

7. The haptic output device of claim 1, wherein the moveable mass is an electromagnetic-driven moveable mass.

8. The haptic output device of claim 1 being a linear resonance actuator.

9. The haptic output device of claim 1, further comprising:
   a damper configured to temporarily engage with the moveable mass to further tune the resonance frequency to the target frequency or frequency range.

10. A method of rendering of a haptic effect at a target frequency or frequency range, comprising:
    providing a moveable mass configured to be driven at a resonance frequency of a primary spring coupled to the moveable mass; and
    rendering the haptic effect at the target frequency by temporarily engaging at least one auxiliary spring with the moveable mass to tune the resonance frequency to the target frequency or frequency range.

11. The method of claim 10, further comprising:
    adjusting a stiffness of at least one auxiliary spring engaged with the moveable mass to further tune the resonance frequency to the target frequency or frequency range.

12. The method of claim 11, wherein the adjusting of the stiffness of at least one auxiliary spring causes a frequency range of the resonance frequency to increase or decrease.

13. The method of claim 10, wherein
    the at least one auxiliary spring includes a first auxiliary spring and a second auxiliary spring coupled to opposing sides of the moveable mass, and
    the rendering of the haptic effect at the target frequency or frequency range includes temporarily engaging the first auxiliary spring with the moveable mass, and temporarily engaging the second auxiliary spring with the moveable mass.

14. The method of claim 13, wherein the first auxiliary spring and the second auxiliary spring are temporarily engaged with the moveable mass at a same time.

15. The method of claim 13, wherein the first auxiliary spring is temporarily engaged with the moveable mass at a first time and the second auxiliary spring is temporarily engaged with the moveable mass at a second time, the second time at least partially overlapping with the first time.

16. The method of claim of 10, wherein
    the at least one auxiliary spring is coupled to an electroadhesive pad, and
    the temporarily engaging of the at least one auxiliary spring with the moveable mass includes coupling the electroadhesive pad to the moveable mass.

17. The method of claim 10, wherein
    the moveable mass, the primary spring and the at least one auxiliary spring are within an actuator, and
    the rendering of the haptic effect at the target frequency or frequency range includes driving the moveable mass using an electromagnetic field generated by applying a current across leads of the actuator.

18. The method of claim 17, wherein the actuator is a linear resonance actuator.

19. The method of claim 10, further comprising:
    coupling a damper to the moveable mass to further tune the resonance frequency to the target frequency or frequency range.

20. A non-transitory computer readable medium having instructions thereon that, when executed by a processor, cause the processor to perform operations comprising:
    driving a moveable mass at a resonance frequency of a primary spring coupled to the moveable mass; and
    rendering a haptic effect at a target frequency or frequency range by temporarily engaging at least one auxiliary spring with the moveable mass to tune the resonance frequency to the target frequency or frequency range.

\* \* \* \* \*